Dec. 21, 1965          F. TAMBURINI                    3,225,287
                    VOLTAGE REGULATING CIRCUIT
Filed Oct. 19, 1962                              2 Sheets-Sheet 1

United States Patent Office 3,225,287
Patented Dec. 21, 1965

3,225,287
VOLTAGE REGULATING CIRCUIT
Fioraldo Tamburini, Turin, Italy, assignor to Fiat Società per Azioni, Turin, Italy
Filed Oct. 19, 1962, Ser. No. 231,659
Claims priority, application Italy, Nov. 11, 1961, 20,531/61
3 Claims. (Cl. 322—68)

This invention relates to voltage regulating circuits including a direct-current generator and a voltage-sensitive electromagnetic relay in a so-called "vibrating contract" arrangement affording a two-stage control for a field winding in the generator.

Circuits of this character are mainly employed on motor vehicles, including a battery to be charged by the direct-current generator and/or any other load.

Figure 1:
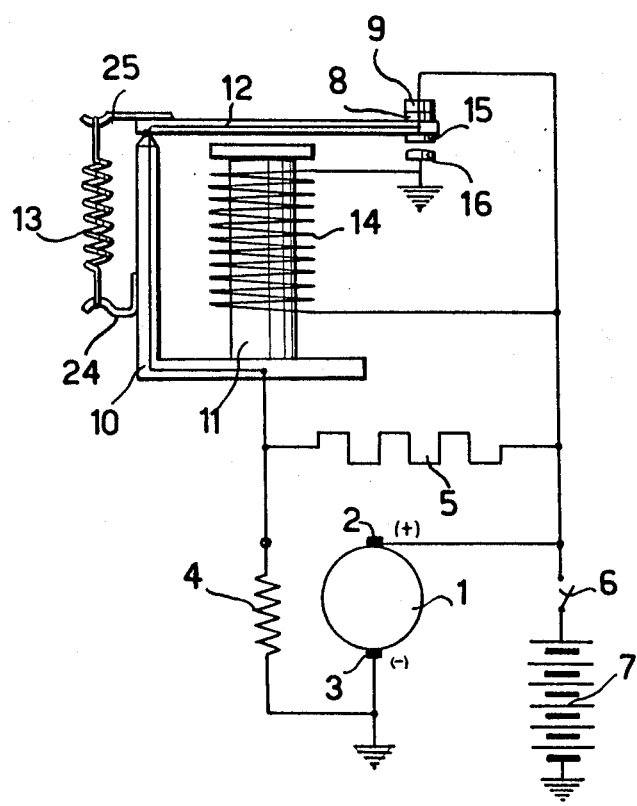
Figure 2:
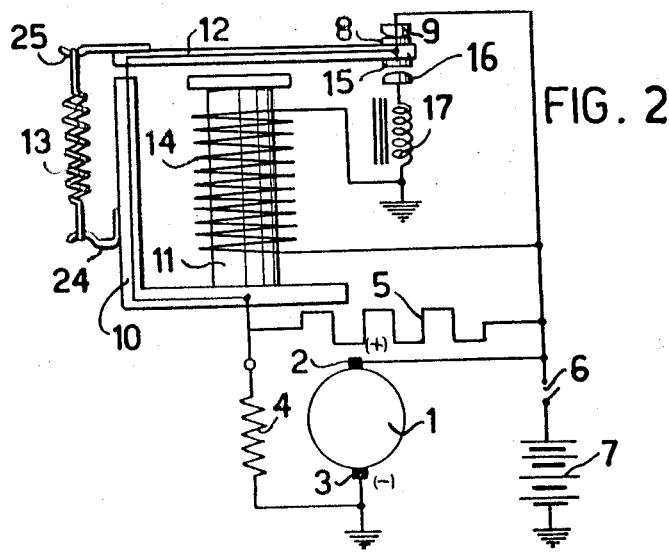
Figure 3:
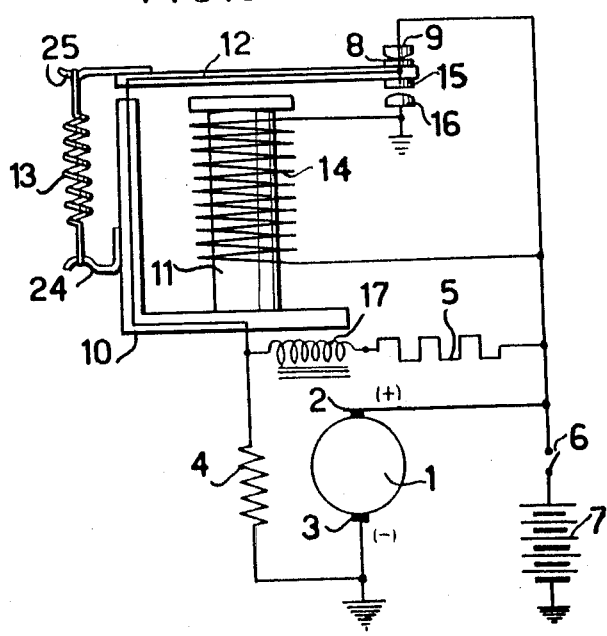

In order to better explain and define the invention, reference is had to the following drawings: FIG. 1 shows a prior art vibrating-contact voltage-regulating circuit. FIG. 2 shows a preferred embodiment of the invention. FIG. 3 shows an alternate embodiment of the invention.

Referring now to the prior art generator shown in FIG. 1, a direct-current generator (dynamo) 1 has a pair of output terminals or brushes 2, 3, one of which is earthed as is usual on motor vehicles; in the example shown, it is the negative terminal 3 which is earthed and it is to be understood that all further earthed components of the circuit are implicitly connected electrically to the earthed terminal 3 via the mass (chassis or frame) of the vehicle. A battery 7 has its positive terminal connected to the positive terminal 2 of the generator 1 via an ignition switch 6, as is conventional in the art, the negative terminal of the battery 7 being earthed, hence electrically connected to the negative terminal 3 of the generator, whereby the battery can be charged by the generator in closed condition of the switch 6. The generator comprises a field winding 4 in series-connection with a control resistor 5 between the output terminals of the generator.

The energizing voltage for the field winding 4 is controlled by an electromagnetic voltage-sensitive relay comprising a fixed armature 10 carrying a core 11, a movable armature or "reed" 12 fulcrumed at one end to the fixed armature 10, and an energizing winding 14 on the core 11. The components 10, 11 and 12 are of a ferromagnetic material, and the reed 12 carries at its free end a pair of opposite contact pins 8, 15, riveted to the reed to provide the "vibrating" contact. A bias spring 13 is tensioned between an extension 25 on the fulcrumed end of the reed 12 and a hook 24 fixed to the fixed armature 10, whereby the contact pin 8 on the reed normally abuts a fixed "break" contact 9 in the relay. For the purposes of voltage regulation, the contacts 8 and 9 are connected across the resistor 5, the current-leading path for the contact 8 (as well as for the contact 15) being usually established by the reed 12 and fixed armature 10 whereby the electrical resistance of both the path and the entire branch including contacts 8, 9, is practically nil; this means that the resistor 5 is short-circuited by the contacts 8, 9, in closed condition of the latter, so that, in operation, full output voltage of the generator 1 is applied to the field winding 4.

A fixed "make" contact 16 is associated with the contact 15 in the relay, said "make" contact being earthed with a view of short-circuiting the field winding 4 when the reed 12 is electromagnetically attracted by the core 11 to an extent such that the contact 15 abuts the "make" contact 16.

The energizing winding 14 in the relay is electrically constantly connected across the output terminals 2, 3, of the generator.

In operation, as is known in the art, the output voltage of the generator increases as the rotational speed of the latter increases. When the output voltage reaches a predetermined "first limit" value, the reed 12 in the relay is magnetically attracted towards the core 11 a small extent such that the pair of contacts 8, 9, opens without, however, the pair of contacts 15, 16, closing; in other words, the reed 12 with its "vibrating contact" 8, 15, is brought to a "floating" condition between the fixed contacts 9, 16. This is a "first stage" of regulation, and it will be seen that in this condition the field winding 4 is energized via the control resistor 5, whereby a reduced voltage is applied to the winding 4 and whereby the output voltage of the generator is correspondingly reduced, even if the rotational speed of the generator continues increasing, provided the battery 7 (and/or the associated electrical plant including headlights, radio-receiver, etc.) absorbed significant current. If this is not the case, the output voltage raises beyond said "first limit" value and reaches a "second limit" value at which the magnetomotive force developed by the energizing winding 14 in the relay attracts the reed 12 by an extent such that the "second stage" contacts 15, 16, close and shunt the field winding 4, whereby the output voltage of the generator 1 drops to an insignificant value.

In this condition a current path is established comprising the positive terminal 2 (hence the positive terminal of the battery 7), resistor 5, armature 10, reed 12, contacts 15, 16, negative terminal 3 (earth), wherein the resistor 5 temporarily acts as load-resistor for the battery and generator.

In practice, the passages of the reed 12 from its normal position shown to the floating position and back, or to its "second stage" position and back, occur with an extreme rapidity at a rate up to several hundreds of strokes per second, and this is the reason for which the above described system is called "vibrating contact system." It will be also apparent from the above that the basic structure of a two-stage vibrating-contact voltage-regulating system for a direct-current generator comprises: a voltage-sensitive relay having a "break" contact (9) and a "make" contact (16) and moreover having its energizing winding (14) connected across the output terminals (2, 3) of the generator, a field winding (4) in the generator having one end connected to one (3) of the output terminals, a control resistor (5) connecting the other end of the field winding to the other terminal (2), a shunt loop (10, 12, 8, 9) controlled by the "break" contact connected across the resistor, and a shunt loop (10, 12, 15, 16) controlled by the "make" contact connected across the field winding, the latter shunt loop providing in its closed condition a current path extending from said other terminal (2) to said one (3) of the terminals through the resistor and "make" contact.

In operation of such a circuit, unavoidable arcing occurs between the contacts 8, 9, and 15, 16. As is known in the art, arcing involves a progressive erosion of contacts. In the instant case, however, erosion of first-stage contacts 8, 9, has been found relatively insignificant, whereas a substantial erosion has been found to systematically occur on the "make" contact 16 connected to the negative terminal 3 of the generator and a substantial amount of metal eroded from the latter contact has been found transferred onto the positive contact 15. On inverting the polarity of both generator and battery (terminal 2 negative, terminal 3 positive), the vibrating contact 15 was found eroded and its material transferred on the "make" contact 16.

Such an erosion of the "second stage" contacts considerably reduces the efficiency and operational life of the system, and it is a main object of this invention to substantially reduce, or even avoid the above transfer of material onto one of the contacts at the expense of the other contact.

Thus, this invention provides a vibrating-contact two-stage voltage-regulating circuit comprising: a direct-current generator having a pair of output terminals, a voltage-sensitive relay having a "break" contact and a "make" contact and moreover having its energizing winding connected across the output terminals of the generator, a field winding in the generator having one end connected to one of the terminals, a control resistor connecting the other end of the field winding to the other terminal in the pair, a shunt loop controlled by the "break" contact connected across the resistor, and a shunt loop controlled by the "make" contact connected across the field winding, said second shunt loop providing in its closed condition a current path extending from said other terminal to said one of the terminals through the resistor and "make" contact, the circuit being characterized in that an auxiliary induction coil (self) is inserted into said current path.

The location of said induction coil on the path is preferably between the resistor and said one of the terminals and, in the most advantageous embodiment, the induction coil is located between said "make" contact and said one of the terminals.

FIGURES 2 and 3 in the accompanying drawings schematically show the circuit of FIG. 1 modified according to two embodiments of the invention. In all figures similar reference numerals designate similar parts.

It will be seen that FIG. 2 is a repetition of FIG. 1, except for an induction coil 17 through which the "make" contact is now earthed. Similarly, FIG. 3 is a repetition of FIG. 1, except for an induction coil 17 connecting the resistor to the shunt loop 10, 12, 15, 16, for the field winding 4. Thus, in FIG. 2 the induction coil 17 is located between the "make" contact 16 and the terminal (3) to which is connected the field winding 4, this being the preferred embodiment of this invention.

Considering the polarities and connections shown on the drawings, it has been found that erosion rate of the "make" contact 16 (which is negative in this case) is in an inverse relation to the inductance value of the coil 17; a similar relation has been found for the contact 15 in inverted polarity conditions. By increasing the inductance value of the coil beyond a specific limit, the erosion and material transfer conditions start reversing, in that the positive contact starts eroding and the material is transferred on the negative contact. It is thought, that the action of the induction coil 17 resides in developing a counter-electromotive force at the breakage of contacts 15, 16, resulting in a secondary arcing of a polarity opposite to that of the primary arcing, whereby erosion and transfer of the material are counteracted.

It is impossible to fix "a priori" definite limit values for the induction coil 17, for such values as well as the optimal value depend on a number of variables, such as nominal output voltage of the generator, the power (watts) of the latter, etc. However, in the case of a 500 watt D.C.-generator delivering 4 amp. maximum current in a 12 volts electrical plant on a motor vehicle, with a control resistor of 3.6–3.9 ohms, erosion is practically avoided by an induction coil 17 comprising a ferrous core of 8 mm. diameter and 30 turns of 0.6 mm. enameled copper wire closely wound on the core (about 18 mm. coil length). The coil is advantageously arranged as shown in FIG. 2, in direct proximity to the "second stage" contacts 15, 16, thereby to avoid any E.M.F. loss between the coil and contacts.

What I claim is:

1. A vibrating-contact two-stage voltage-regulating circuit comprising: a direct-current generator having a pair of output terminals, a voltage-sensitive relay having a "break" contact and a "make" contact and moreover having its energizing winding connected across the output terminals of the generator, a field winding in the generator having one end connected to one of the terminals in the pair, a control resistor connecting the other end of the field winding to the other terminal in the pair, a shunt loop controlled by the "break" contact connected across the resistor, and a second shunt loop controlled by the "make" contact connected across the field winding, said second shunt loop providing in its closed condition a current path extending from said other terminal to said one of the terminals through the resistor and the "make" contact; said circuit comprising moreover included an auxiliary induction coil included in said current path for limiting mass transfer between the contacts of said "make" contact.

2. A vibrating-contact two-stage voltage-regulating circuit comprising: a direct-current generator having a pair of output terminals, a voltage-sensitive relay having a "break" contact and a "make" contact and moreover having its energizing winding connected across the output terminals of the generator, a field winding in the generator having one end connected to one of the terminals in the pair, a control resistor connecting the other end of the field winding to the other terminal in the pair, a shunt loop controlled by the "break" contact connected across the resistor, and a shunt loop controlled by the "make" contact connected across the field winding, said second shunt loop providing in its closed condition a current path extending from said other terminal to said one of the terminals through the resistor and the "make" contact; said circuit comprising moreover an auxiliary induction coil included in said current path at a location between the resistor and said one of the terminals for limiting mass transfer between the contacts of said "make" contact.

3. A vibrating-contact two-stage voltage-regulating circuit comprising: a direct-current generator having a pair of output terminals, a voltage-sensitive relay having a "break" contact and a "make" contact and moreover having its energizing winding connected across the output terminals of the generator, a field winding in the generator having one end connected to one of the terminals in the pair, a control resistor connecting the other end of the field winding to the other terminal in the pair, a shunt loop controlled by the "break" contact connected across the resistor, and a shunt loop controlled by the "make" contact connected across the field winding, said second shunt loop providing in its closed condition a current path extending from said other terminal to said one of the terminals through the resistor and the "make" contact; said circuit comprising moreover an auxiliary induction coil included in said current path at a location between the "make" contact and said one of the terminals for limiting mass transfer between the contacts of said "make" contact.

References Cited by the Examiner

UNITED STATES PATENTS

| | | | |
|---|---|---|---|
| 2,205,350 | 6/1940 | Exner | 322—68 |
| 2,289,059 | 7/1942 | McNairy | 322—68 |
| 2,501,323 | 3/1950 | Frink | 317—11 |
| 2,689,936 | 9/1954 | Kirsch et al. | 322—68 |
| 2,864,976 | 12/1958 | Smith | 317—11 |
| 2,884,584 | 4/1959 | Brueckner | 317—11 |

LLOYD McCOLLUM, *Primary Examiner.*

A. H. TISCHER, *Assistant Examiner.*